United States Patent
Jonsson et al.

(10) Patent No.: US 9,019,854 B2
(45) Date of Patent: Apr. 28, 2015

(54) METHOD FOR SETTING AND ADJUSTING A PARAMETER DEPENDENT ON A ROUND TRIP TIME

(75) Inventors: Anders Jonsson, Täby (SE); Namir Lidian, Solna (SE); Louise Sun, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 238 days.

(21) Appl. No.: 13/642,645

(22) PCT Filed: Apr. 26, 2010

(86) PCT No.: PCT/SE2010/050462
§ 371 (c)(1),
(2), (4) Date: Oct. 22, 2012

(87) PCT Pub. No.: WO2011/136705
PCT Pub. Date: Nov. 3, 2011

(65) Prior Publication Data
US 2013/0039208 A1 Feb. 14, 2013

(51) Int. Cl.
*H04L 12/26* (2006.01)
*H04L 12/24* (2006.01)
*H04W 56/00* (2009.01)
(Continued)

(52) U.S. Cl.
CPC ........ *H04L 43/0864* (2013.01); *H04L 41/0816* (2013.01); *H04W 56/0045* (2013.01); *H04B 7/185* (2013.01); *H04W 56/0055* (2013.01); *H04W 92/04* (2013.01)

(58) Field of Classification Search
None
See application file for complete search history.

(56) References Cited

U.S. PATENT DOCUMENTS

| | | | |
|---|---|---|---|
| 6,681,099 B1* | 1/2004 | Keranen et al. | 455/67.16 |
| 6,901,081 B1* | 5/2005 | Ludwig | 370/519 |
| 7,423,977 B1* | 9/2008 | Joshi | 370/252 |

(Continued)

FOREIGN PATENT DOCUMENTS

| | | |
|---|---|---|
| JP | 2005072933 A | 3/2005 |
| WO | 0135580 A1 | 5/2001 |

(Continued)

OTHER PUBLICATIONS

Author Unknown, "Discussion on the L2 Buffer Size," Ericsson; 3GPP TSG-RAN WG2#62; R2-082406; May 5-9, 2008. pp. 1-4. Kansas City, Missouri, US.

*Primary Examiner* — Ian N Moore
*Assistant Examiner* — Phong La
(74) *Attorney, Agent, or Firm* — Murphy, Bilak & Homiller, PLLC

(57) ABSTRACT

An arrangement (17) is provided for setting and adjusting at least one parameter in a radio communication network (11), which is used in control of communication in the radio communication network and which is dependent on a round trip time for a signal travelling from a radio network controller (13) to a user equipment (16) and back to the radio network controller. The arrangement comprises a module (17a) for initially estimating a maximum value of the round trip time; a setting module (17b) for initially setting the parameter depending on the initially estimated maximum value of the round trip time; a module (17c) for measuring the round trip time; and a module (17d) for adjusting the parameter depending on the measured round trip time, wherein the measured round trip time is expected to be shorter than the initially estimated maximum value of the round trip time.

14 Claims, 2 Drawing Sheets

(51) Int. Cl.
*H04B 7/185* (2006.01)
*H04W 92/04* (2009.01)

(56) References Cited

U.S. PATENT DOCUMENTS

| | | | | |
|---|---|---|---|---|
| 7,602,719 | B2* | 10/2009 | Speight et al. | 370/235 |
| 2002/0094820 | A1* | 7/2002 | Keranen et al. | 455/456 |
| 2002/0150048 | A1* | 10/2002 | Ha et al. | 370/231 |
| 2002/0167948 | A1* | 11/2002 | Chen | 370/392 |
| 2002/0176443 | A1* | 11/2002 | Wei et al. | 370/468 |
| 2003/0103486 | A1* | 6/2003 | Salt et al. | 370/350 |
| 2004/0052234 | A1* | 3/2004 | Ameigeiras et al. | 370/338 |
| 2004/0120306 | A1* | 6/2004 | Wigard et al. | 370/349 |
| 2004/0122969 | A1* | 6/2004 | Ameigeiras et al. | 709/235 |
| 2004/0246898 | A1* | 12/2004 | Peisa et al. | 370/235 |
| 2005/0066028 | A1* | 3/2005 | Illikkal et al. | 709/224 |
| 2005/0286416 | A1* | 12/2005 | Shimonishi et al. | 370/229 |
| 2006/0067238 | A1* | 3/2006 | Olsson et al. | 370/242 |
| 2006/0159098 | A1* | 7/2006 | Munson et al. | 370/394 |
| 2007/0076626 | A1 | 4/2007 | Wise et al. | |
| 2007/0091922 | A1* | 4/2007 | Elliot et al. | 370/468 |
| 2007/0133475 | A1* | 6/2007 | Peisa et al. | 370/335 |
| 2008/0232405 | A1* | 9/2008 | Gallo | 370/498 |
| 2009/0006920 | A1* | 1/2009 | Munson et al. | 714/748 |
| 2009/0259911 | A1* | 10/2009 | Tseng | 714/748 |
| 2009/0323604 | A1* | 12/2009 | De Jaeger et al. | 370/329 |
| 2010/0039938 | A1* | 2/2010 | Sagfors | 370/238 |
| 2010/0091721 | A1* | 4/2010 | Larmo et al. | 370/329 |
| 2010/0095183 | A1* | 4/2010 | Petrovic et al. | 714/748 |
| 2010/0226384 | A1* | 9/2010 | Prabhakar et al. | 370/412 |
| 2010/0260049 | A1* | 10/2010 | Racz et al. | 370/235 |
| 2011/0096732 | A1* | 4/2011 | Rashid et al. | 370/329 |
| 2012/0054362 | A1* | 3/2012 | Tsao et al. | 709/232 |
| 2012/0075993 | A1* | 3/2012 | Elliot et al. | 370/235 |
| 2012/0275336 | A1* | 11/2012 | Wise et al. | 370/252 |
| 2013/0157661 | A1* | 6/2013 | Bhaskaran et al. | 455/436 |

FOREIGN PATENT DOCUMENTS

| | | |
|---|---|---|
| WO | 2006104341 A2 | 10/2006 |
| WO | 2009131507 A1 | 10/2009 |

* cited by examiner

METHOD FOR SETTING AND ADJUSTING A PARAMETER DEPENDENT ON A ROUND TRIP TIME

TECHNICAL FIELD

The invention relates to an arrangement and a method for setting and adjusting a communication control parameter in a radio communication network, which parameter is dependent on a round trip time for a signal travelling from a radio network controller to a user equipment and back to the radio network controller.

BACKGROUND

Satellite links are characterized by rather high RLC (Radio Link Control) RTT (Round Trip Time), typically longer than 500-1000 ms, which are difficult to handle using conventional fixed RLC timer values. Such timer values are usually applied in more conventional links with a significantly lower RLC RTT, i.e. typically shorter than 100-200 ms. Therefore, the satellite links require special tables or entries in existing tables with suitable RLC timer values.

A drawback of such approach is that the radio network controller of the radio communication network has to include rules that select which RLC timer values should be used for each link. Further, the tables may be extensive, in particular if the radio communication system supports multiple radio bearer combinations, since unique RLC timer values have to be stored for each radio bearer. In addition, each new radio bearer that is added, needs to be assigned unique RLC timer values leading to additional table updates and maintenance work.

A further drawback is that different satellite links may have different latency characteristics and therefore a fixed set of RLC timer values for all satellite links may not be optimum, or functional problems may occur. A table based solution with fixed timer values has typically to take worst case scenarios into consideration, which leads to too conservative timer values. As a result, the throughput and the latency are adversely affected.

Particularly, in radio communication systems having high BLER (Block error Rate), high RLC RTT deteriorates system performance, and optimum RLC timer values are thus especially important in such systems.

SUMMARY OF THE INVENTION

An object of the present invention is therefore to provide an arrangement and a method for setting and adjusting at least one parameter in a radio communication network, which parameter is used in control of communication in the radio communication network and which is dependent on a round trip time for a signal travelling from a radio network controller to a user equipment and back to the radio network controller, e.g. a RLC timer value, by which at least some of the drawbacks as disclosed above in the background chapter are avoided or at least alleviated.

It is a further object of the invention to provide such arrangement and method, which provide for an improved operation of the radio communication network in which they are implemented, such that low latency and high throughput can be obtained.

It is yet a further object of the invention to provide such arrangement and method, which are fast, simple, accurate, precise, and of low cost.

These objects, among others, are according to a first aspect of the present invention attained by an arrangement which comprises a module for initially estimating a maximum value of the round trip time, a module for initially setting the parameter based on the initially estimated maximum value of the round trip time, a module for measuring the round trip time, and a module for adjusting the parameter based on the measured round trip time. The measured round trip time is expected to be shorter than the initially estimated maximum value of the round trip time. The invention is preferably implemented in radio communication networks which include satellite links which are characterized by longer and more unpredictable round trip times.

An initially estimated maximum value of the round trip time, which is expected to be longer than the actual round trip time, ensures that a conservative initial parameter setting is used in order to make certain that even the satellite links with the poorest delay characteristics will function. This initial conservative parameter setting is then adjusted by the function to conform to the actual delay characteristics of the link by utilizing knowledge of the RLC RTT gained by the measuring module as described above.

It should be noted that while the invention primarily targets satellite applications, the invention is equally applicable to fine adjust RLC timer values for conventional connections such as e.g. in ordinary terrestrial WCDMA networks. The result for both conventional and satellite links is that optimum RLC timer values will always be used thanks to the self adjusting functionality of the invention.

In one version of the invention the measuring module measures the round trip time according to the following steps. The initially estimated maximum value of the round trip time is gradually decreased, the parameter is repeatedly set based on the gradually decreased maximum value, the repeatedly set parameter is used for control of communication in the radio communication network, a quality parameter of the communication in the radio communication network is monitored, and the round trip time is determined based on the repeatedly set parameter and the monitored quality parameter of the communication in the radio communication network.

In another version of the invention, the measuring module measures the round trip time according to the following steps. A query is sent from the radio network controller to the user equipment, a response to the query from the user equipment is received in the radio network controller, and the round trip time is determined based on the time at which the query was sent and the time at which the response was received. If the radio communication network is a WCDMA radio communication network, the query may a polling RLC PDU (Protocol Data Unit) and the response may be a status report, ACK (Acknowledgement of reception) or NACK (Negative Acknowledgement of reception), triggered by the polling RLC PDU. Advantageously, the polling RLC PDU has a sequence number higher or lower than the RLC window.

In yet another version of the invention, wherein the radio communication network is a WCDMA radio communication network, the measuring module measures the round trip time according to the following steps. An NSCF (Node Synchronization Control frame) is sent from the radio network controller to a radio base station connected to the radio network controller, and via which the user equipment is connected. A response NSCF to the sent NSCF is subsequently received from the radio base station at the radio network controller. Then, a round trip time for a signal travelling from the radio network controller to the radio base station and back to the radio network controller is determined based on the time at which the NSCF was sent and the time at which the response NSCF was received. A fixed round trip time for a signal travelling from the radio base station to the user equipment and back to the radio base station is estimated. Finally, the round trip time for a signal travelling from the radio network controller to the user equipment and back to the radio network controller is calculated as the sum of the determined round trip time for a signal travelling from the radio network controller to the radio base station and back to the radio network controller and the fixed round trip time for a signal travelling from the radio base station to the user equipment and back to the radio base station.

Here, the fixed round trip time for a signal travelling from the radio base station to the user equipment and back to the radio base station is estimated based on TTIDL (Transmission Time Interval Downlink), TTIUL (Transmission Time Interval Uplink), TTI alignment DL, TTI alignment UL, jitter delay, processing delay in user equipment, and HARQ (Hybrid Automatic Repeat Request) delay.

It shall be appreciated that the adjustment of the parameter may be performed on any suitable time scale, i.e. only once or repeatedly, e.g. during a communication, i.e. the measuring module measures the round trip time repeatedly and the adjusting module adjusts the parameter depending on the repeatedly measured round trip time, e.g. on the last measured round trip time or on an average of a plurality of last measured round trip times. Too high measured RTT values may be discarded. The average value is typically used to achieve higher accuracy; the more measured round trip times used, the higher accuracy is achieved.

Further, the above-mentioned objects, among others, are according to a second aspect of the present invention attained by a method, according to which a maximum value of the round trip time is initially estimated, the parameter is next set depending on the initially estimated maximum value of the round trip time, the round trip time is measured, and finally the parameter is adjusted depending on the measured round trip time. As before, the measured round trip time is expected to be shorter than the initially estimated maximum value of the round trip time. Similarly, the round trip time may be measured according to the approaches described above.

Problems to handle data transport over satellite links due to the excessive RLC RTT associated with such connections can be addressed by the invention. In addition, satellite links with different delay characteristics can all be served by the same function.

An important advantage of the invention is the improved latency characteristics which has a positive influence on the throughput using e.g. the TCP protocol since RLC timer values may be set more optimally then what would have been possible with a table of fixed values, since such fixed values would have been set to take care of the worst case performing links.

It shall be appreciated that while the detailed description discloses embodiments implemented in WCDMA communication systems, the present invention is not limited to such standard, but can be implemented in various kind of communication systems using retransmission protocols such as e.g. LTE (Long Term Evolution), CDMA200, and WLAN (Wireless Local Area network) communication systems.

BRIEF DESCRIPTION OF THE DRAWINGS

The invention will now be described in more detail in relation to the enclosed drawing, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

Figure 1:
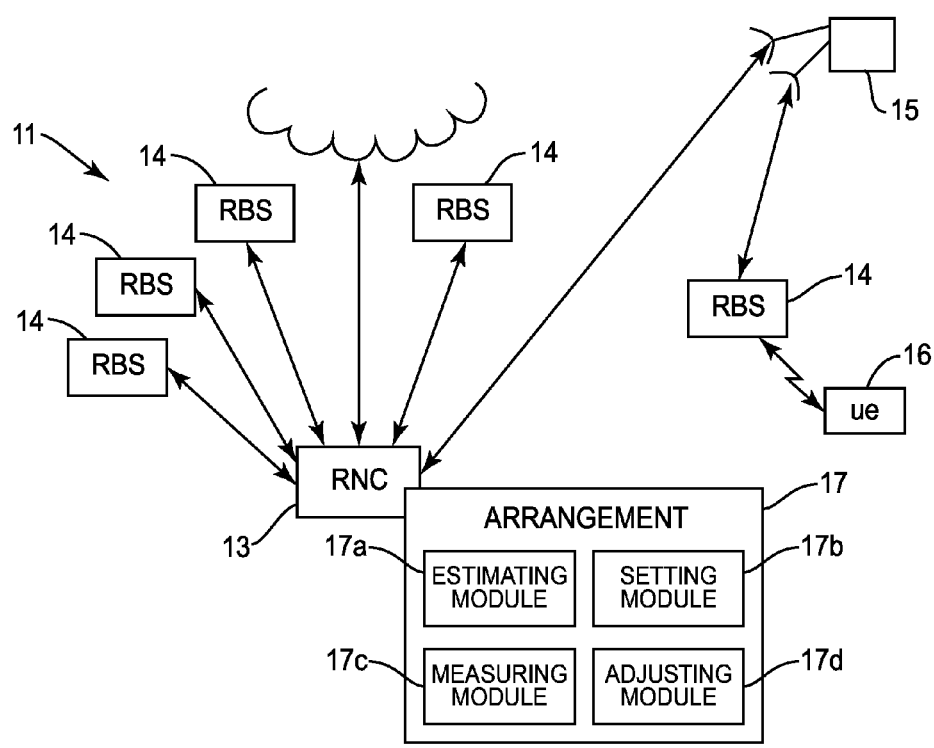
FIG. 1 illustrates schematically a radio communication network in which an arrangement according to an embodiment of the present invention is implemented.

FIG. 1 illustrates schematically a WCDMA radio communication network 11 in which an arrangement according to an embodiment of the present invention is implemented. The radio communication network 11 comprises an RNC (Radio Network Controller) 13, and a plurality of RBS's (Radio Base Stations) 14, each of which being connected to the RNC 13. Preferably, at least one RBS 14 is connected to the RNC 13 over a satellite 15. A UE (user equipment) 16, such as a mobile phone, is capable of communicating with the RNC 13 via one of the RBS's 14, e.g. the RBS 14 that is connected to the RNC 13 via the satellite 15.

The RNC 13 uses RLC (Radio Link Control) timer values during control of communication in the network, wherein the RLC timer values are parameter values set based on the RLC RTT's (Round Trip Time) for signals travelling from the RNC 13 to UE's, such as the illustrated UE 16, and back to the RNC 13. The RLC RTT varies from link to link depending on the delay characteristics thereof. In particular, for satellite links the RLC RTT is much longer than for conventional terrestrial links. As a result, different RLC timer values have to be used for different communication links.

The present invention addresses this problem in a novel manner and provides a self adjusting functionality to thereby be capable of using optimum RLC timer values for each link attuned, at each instant, to the latency characteristics of that link. To this end, an inventive arrangement 17 for setting and adjusting RLC timer values, i.e. parameter values dependent on the RTT's in the radio communication network 11 and used for communication control, is provided in the radio communication network 11, preferably software implemented in the RNC 13. The arrangement 17 comprises an estimating module 17a, a setting module 17b, a measuring module 17c, and an adjusting module 17d. While, the arrangement 17 is illustrated as being implemented in a single node, i.e. the RNC 13, the invention is not limited to such case. The arrangement of the invention may be implemented in other node or may be distributed over a plurality of nodes.

The estimating module 17a is responsible for initially estimating a maximum value of the RTT for a given link. The maximum value of the RTT is determined such that it is expected to be equal to or longer than the actual RTT. That is, the maximum value of the RTT is set to correspond to a worst case delay link. The setting module 17b is responsible for initially setting the RLC timer value based on the initially estimated maximum value of the RTT. This conservative RLC timer value is set to ensure that the communication on the link can be established. The measuring module 17c is then arranged to actually measure or determine the RTT. Finally, the adjusting module 17d is responsible for adjusting the RLC timer value based on the measured RTT. In other words, the link is initially set up with conservative RLC timer values, which are then modified to suit the actual delay characteristics of the link. Since optimum RLC timer values are closely related to the actual RLC RTT there is a need to access the actual RLC RTT in order to configure the link with optimum RLC timer values.

It shall be appreciated that the measuring module 17c and the adjusting module 17d may operate continuously or repeatedly during communication on a link in order to dynamically adjust the RLC timer value for that link. Also for a single adjustment, repeatedly measured RTT values may be used in order to increase accuracy in the measurement.

The measuring module 17c may measure the RTT in a plurality of manners.

In a first embodiment of the invention, the measuring module 17c measures the RTT over a link in an indirect manner. The initially estimated maximum value of the RTT is gradually decreased. The RLC timer value is repeatedly set based on the gradually decreased maximum value. The repeatedly set timer value is used continuously for control of communication over the link in question. A quality parameter of the communication over the link is monitored. Finally, the RTT is determined based on the repeatedly set parameter and the monitored quality parameter of the communication over the link. For instance, spurious retransmissions may be monitored, and when such retransmissions occur, optimum RLC timer values have been used just before these occur.

In an exemplary embodiment a polling RLC (Radio Link Control) PDU (Protocol Data Unit) is sent from the RNC 13 and a status report, ACK (Acknowledgement of reception) or NACK (Negative Acknowledgement of reception), triggered by the polling RLC PDU, is received back. The RLC timer is a poll timer. Spurious retransmission is in this exemplary embodiment understood as additional polling RLC PDU's are sent before the transmitting entity has received and processed the status report triggered by the previously sent polling RLC PDU. This condition will result in a substantial increase in RLC retransmission indicating that the poll timer coincides with the RLC RTT.

In another embodiment of the invention, the measuring module 17c sends a query from the RNC 13 to the UE 16. Then, a response to the query from the UE 16 is received at the RNC 13. Finally, the RTT is determined based on the time at which the query was sent and on the time at which the response was received. Implementing this embodiment in a WCDMA radio communication network, the query may be a polling RLC (Radio Link Control) PDU (Protocol Data Unit) and the response may be a status report, ACK (Acknowledgement of reception) or NACK (Negative Acknowledgement of reception), triggered by the polling RLC PDU. Preferably, the polling RLC PDU has a sequence number outside the RLC window. In such case, however, a so-called RLC reset, which is typically performed by the RNC 13 in response to receiving the status report, is prevented from being made. An advantage with this approach is that it can be used even though the connection activity is such that it is difficult to determine which PDU initiates which status report.

RLC timer values as set and adjusted by the present invention may include timer RST, timer poll and timer status prohibit. However, the invention is not limited to these but may be used for a number of other RLC timer values.

In yet another embodiment of the invention, wherein the radio communication network is a WCDMA network, the measuring module 17c measures the RLC RTT by using the node synchronization measurement function in the RNC 13. An NSCF (Node Synchronization Control frame) is sent from the RNC 13 to an RBS 14 connected to the RNC 13, and via which the UE 16 is connected. A response NSCF to the sent NSCF is received from the RBS 14 at the RNC 13. The RTT for a signal travelling from the RNC 13 to the RBS 14 and back to the RNC 13, here denoted $RTT_{RNC-RBS-RNC}$, based on the time at which the NSCF was sent and the time at which the response NSCF was received.

More in detail, the $RTT_{RNC-RBS-RNC}$ as measured by the node synchronization is $$RTT_{RNC-RBS-RNC} = T_4 - T_1 - T_3 + T_2$$

where
$T_1$—sending time stamp of the control frame in the RNC
$T_2$—reception time stamp of the control frame in the RBS
$T_3$—sending time stamp of the control frame in the RBS
$T_4$—reception time stamp of the control frame in the RNC Next, a fixed RTT for a signal travelling from the RBS 14 to the UE 16 and back to the RBS 14, here denoted $RTT_{RBS-UE-RBS}$, is estimated. The fixed RTT for a signal travelling from the RBS 14 to the UE 16 and back to the RBS 14 is preferably based on TTIDL (Transmission Time Interval Downlink), TTIUL (Transmission Time Interval Uplink), TTI alignment DL, TTI alignment UL, jitter delay, processing delay in UE 16, and HARQ (Hybrid Automatic Repeat Request) delay according to the following formula:

$RTT_{RBS-UE-RBS}$=TTIDL+TTIUL+TTI alignment DL+TTI alignment UL+Jitter delay+UE processing delay+HARQ delay wherein estimated values are:

TTIDL 2-40 ms depending on radio bearer type
TTIUL 2-40 ms depending on radio bearer type
TTI alignment DL 2-40 ms depending on radio bearer type
TTI alignment UL 2-40 ms depending on radio bearer type
Jitter delay 50-100 ms
UE processing delay 50-100 ms
HARQ delay 10-40 ms Finally, the RTT for a signal travelling from the RNC 13 to the UE 16 and back to the RNC 13, here denoted $RTT_{RNC-UE-RNC}$, is calculated as the sum of the determined RTT for a signal travelling from the RNC 13 to the RBS 14 and back to the RNC 13 and the estimated fixed round trip time for a signal travelling from the RBS 14 to the UE 16 and back to the RBS 14, i.e.

$RTT_{RNC-UE-RNC}=RTT_{RNC-RBS-RNC}$ (measured by node synch)+$RTT_{RBS-UE-RBS}$ (estimated fixed)

Figure 2:
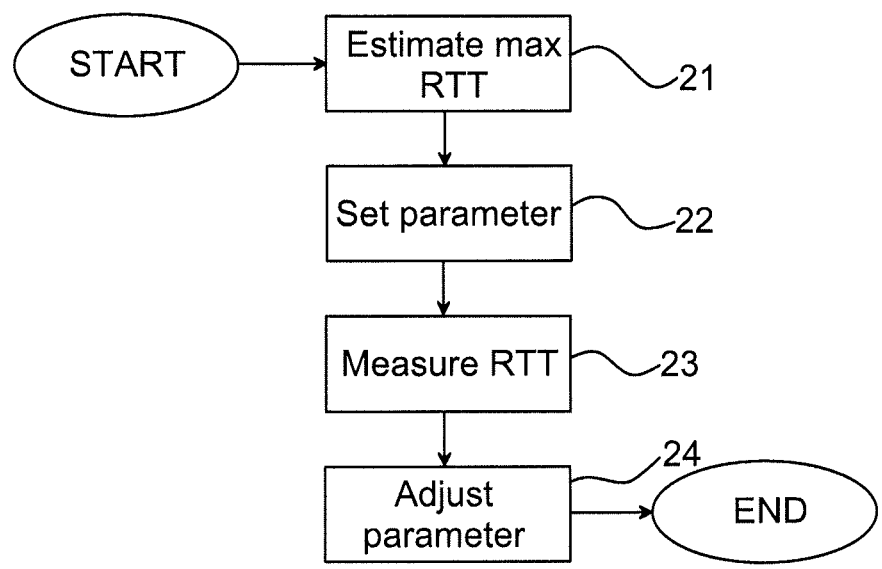
FIG. 2 is a flow scheme of a method according to another embodiment of the invention.

FIG. 2 is a flow scheme of a method for setting and adjusting a parameter in a radio communication network according to another embodiment of the invention. The parameter is used for control during communication in the radio communication network and is dependent on the RTT for a signal travelling from a radio network controller to a user equipment and back to the radio network controller. The method begins by, in a step 21, initially estimating a maximum value of the RTT, wherein the maximum value corresponds to the RTT for an expected worst case link delay. Next, the parameter is, in a step 22, set based on the initially estimated maximum value of the RTT. This setting is a conservative setting ensuring functionality on the link. Next, the RTT is, in a step 23, measured or determined. The RTT may be determined according to any of the approaches discussed above. Finally, the parameter is, in a step 24, adjusted based on the measured RTT, and the method is ended. The measured RTT is thus obviously expected to be shorter than the initially estimated maximum value of the RTT.

While the invention has been described in connection with what is presently considered to be most practical and preferred embodiments, it is to be understood that the invention is not to be limited to the disclosed embodiments, but on the contrary, is intended to cover various modifications and equivalent arrangements.

Therefore the invention is only to be limited by the following claims.

In particular, while the invention has been described in conjunction with a communication link which includes a satellite link between a radio network controller and a radio base station, the invention is not limited in this regard. The present invention is applicable to a large variety of communication links with and without satellite connections.

The invention claimed is:

1. An arrangement for setting and adjusting at least one parameter in a WCDMA (Wideband CDMA) radio communication network, said at least one parameter being used in control of communication in said radio communication network and being dependent on a round trip time for a signal travelling from a radio network controller to a user equipment and back to said radio network controller, said arrangement comprising:
    an estimating module configured to initially estimate a maximum value of the round trip time;
    a setting module configured to initially set said at least one parameter depending on the initially estimated maximum value of the round trip time;
    a measuring module configured to measure the round trip time; and
    an adjusting module configured to adjust said at least one parameter depending on the measured round trip time, wherein the measured round trip time is expected to be shorter than the initially estimated maximum value of the round trip time,
    wherein said measuring module is configured to measure the round trip time by:
        sending an NSCF (Node Synchronization Control frame) from said radio network controller to a radio base station connected to the radio network controller, and via which said user equipment is connected;
        receiving in said radio network controller a response NSCF to said sent NSCF from said radio base station;
        determining a round trip time for a signal travelling from said radio network controller to said radio base station and back to said radio network controller based on a time at which said NSCF was sent and the time at which said response NSCF was received;
        estimating a fixed round trip time for a signal travelling from said radio base station to said user equipment and back to said radio base station; and
        calculating the round trip time for said signal travelling from said radio network controller to said user equipment and back to said radio network controller as a sum of the determined round trip time for said signal travelling from said radio network controller to said radio base station and back to said radio network controller and the fixed round trip time for said signal travelling from said radio base station to said user equipment and back to said radio base station.

2. The arrangement of claim 1, wherein said measuring module is configured to measure the round trip time by:
    gradually decreasing the initially estimated maximum value of the round trip time;
    repeatedly setting said at least one parameter depending on the gradually decreased maximum value;
    using said repeatedly set parameter for control of the communication in said radio communication network;
    monitoring a quality parameter of the communication in said radio communication network; and
    determining the round trip time based on said repeatedly set parameter and the monitored quality parameter of the communication in said radio communication network.

3. The arrangement of claim 1, wherein said measuring module is configured to measure the round trip time by:
    sending a query from said radio network controller to said user equipment;
    receiving in said radio network controller a response to said query from said user equipment; and
    determining the round trip time based on the time at which said query was sent and the time at which said response was received.

4. The arrangement of claim 3, wherein the arrangement is configured to set and adjust said at least one parameter in a Wideband CDMA (WCDMA) radio communication network, wherein said query is a polling RLC (Radio Link Control) PDU (Protocol Data Unit) and said response is a status report, ACK (Acknowledgement of reception) or NACK (Negative Acknowledgement of reception), triggered by the polling RLC PDU.

5. The arrangement of claim 4, wherein said polling RLC PDU has a sequence number higher or lower than the RLC window.

6. The arrangement of claim 1, wherein said measuring module is configured to estimate the fixed round trip time for a signal travelling from said radio base station to said user equipment and back to said radio base station based on TTIDL (Transmission Time Interval Downlink), TTIUL (Transmission Time Interval Uplink), TTI alignment DL, TTI alignment UL, jitter delay, processing delay in user equipment, and HARQ (Hybrid Automatic Repeat Request) delay.

7. The arrangement of claim 1, wherein said measuring module is configured to:
    measure the round trip time repeatedly during a communication between a radio network controller and a user equipment; and
    adjust said at least one parameter depending on the repeatedly measured round trip time.

8. The arrangement of claim 1, wherein the arrangement comprises part of said radio network controller that is configured to connect to a radio base station via a satellite link, said radio base station in turn being connected to said user equipment.

9. A radio network controller comprising an arrangement for setting and adjusting at least one parameter in a WCDMA (Wideband CDMA) radio communication network, said at least one parameter being used in control of communication in said radio communication network and being dependent on a round trip time for a signal travelling from the radio network controller to a user equipment and back to said radio network controller, and said arrangement comprising:
    an estimating module configured to initially-estimate a maximum value of the round trip time;
    a setting module configured to initially set said at least one parameter depending on the initially estimated maximum value of the round trip time;
    a measuring module configured to measure the round trip time; and
    an adjusting module configured to adjust said at least one parameter depending on the measured round trip time, wherein the measured round trip time is expected to be shorter than the initially estimated maximum value of the round trip time,
    wherein said measuring module is configured to measure the round trip time by:
        sending an NSCF (Node Synchronization Control frame) from said radio network controller to a radio base station connected to the radio network controller, and via which said user equipment is connected;

receiving in said radio network controller a response NSCF to said sent NSCF from said radio base station;

determining a round trip time for a signal travelling from said radio network controller to said radio base station and back to said radio network controller based on a time at which said NSCF was sent and the time at which said response NSCF was received;

estimating a fixed round trip time for a signal travelling from said radio base station to said user equipment and back to said radio base station; and calculating the round trip time for said signal travelling from said radio network controller to said user equipment and back to said radio network controller as a sum of the determined round trip time for said signal travelling from said radio network controller to said radio base station and back to said radio network controller and the fixed round trip time for said signal travelling from said radio base station to said user equipment and back to said radio base station.

10. A method for setting and adjusting at least one parameter in a WCDMA (Wideband CDMA) radio communication network, said at least one parameter being used for control in communication in said radio communication network and being dependent on a round trip time for a signal travelling from a radio network controller to a user equipment and back to said radio network controller, said method comprising:

initially estimating a maximum value of the round trip time;

initially setting said at least one parameter depending on the initially estimated maximum value of the round trip time;

measuring the round trip time; and adjusting said at least one parameter depending on the measured round trip time, wherein the measured round trip time is expected to be shorter than the initially estimated maximum value of the round trip time, wherein measuring the round trip time comprises:

sending an NSCF (Node Synchronization Control frame) from said radio network controller to a radio base station connected to the radio network controller, and via which said user equipment is connected;

receiving in said radio network controller a response NSCF to said sent NSCF from said radio base station;

determining a round trip time for a signal travelling from said radio network controller to said radio base station and back to said radio network controller based on a time at which said NSCF was sent and the time at which said response NSCF was received;

estimating a fixed round trip time for a signal travelling from said radio base station to said user equipment and back to said radio base station; and calculating the round trip time for said signal travelling from said radio network controller to said user equipment and back to said radio network controller as a sum of the determined round trip time for said signal travelling from said radio network controller to said radio base station and back to said radio network controller and the fixed round trip time for said signal travelling from said radio base station to said user equipment and back to said radio base station.

11. The method of claim 10, wherein said round trip time is measured by:

gradually decreasing the initially estimated maximum value of the round trip time;

repeatedly setting said at least one parameter depending on the gradually decreased maximum value of the round trip time;

using said repeatedly set said at least one parameter for control of communication in said radio communication network;

monitoring a quality parameter of the communication in said radio communication network; and determining the round trip time based on the repeatedly set said at least one parameter and the monitored quality parameter of the communication in said radio communication network.

12. The method of claim 10, wherein said round trip time is measured by:

sending a query from said radio network controller to said user equipment;

receiving in said radio network controller a response to said query from said user equipment; and determining the round trip time based on the time at which said query was sent and the time at which said response was received.

13. The method of claim 12, wherein said at least one parameter is set and adjusted in a WCDMA (Wideband CDMA) radio communication network, wherein said query is a polling RLC (Radio Link Control) PDU (Protocol Data Unit) and said response is a status report, ACK (Acknowledgement of reception) or NACK (Negative Acknowledgement of reception), triggered by the polling RLC PDU.

14. A method of setting and adjusting a Radio Link Control (RLC) timer at a Radio Network Controller (RNC) in a WCDMA (Wideband CDMA) radio communication network, said method comprising:

setting up a communication link between the RNC and a User Equipment (UE) using the RLC timer as initialized according to a maximum Round Trip Time (RTT) representing a worst-case link delay for the communication link;

measuring actual link delays of the communication link after setting up the communication link; and adjusting the RLC timer according to the actual link delays measured for the communication link, so that the RLC timer, as used for RLC of the communication link, suits actual delay characteristics of the communication link, wherein a respective actual link delay of the actual link delays is measured by:

sending an NSCF (Node Synchronization Control frame) from the RNC to a radio base station connected to the RNC, and via which the UE is connected;

receiving in the RNC a response NSCF to said sent NSCF from said radio base station;

determining a round trip time for a signal travelling from the RNC to said radio base station and back to the RNC based on a time at which said NSCF was sent and the time at which said response NSCF was received;

estimating a fixed round trip time for a signal travelling from said radio base station to the UE and back to said radio base station; and calculating the respective actual link delay for said signal travelling from the RNC to the UE and back to the RNC as a sum of the determined round trip time for said signal travelling from the RNC to said radio base station and back to the RNC and the fixed round trip time for said signal travelling from said radio base station to the UE and back to said radio base station.

* * * * *